United States Patent [19]
Mari et al.

[11] Patent Number: 5,214,252
[45] Date of Patent: May 25, 1993

[54] LOGGING METHOD AND DEVICE IN WELL BORES UTILIZING DIRECTIONAL EMISSION AND/OR RECEPTION MEANS

[76] Inventors: Jean-Luc Mari, 61a, rue Jules Ferry, 78400 Chatou; Jacques Lessi, 13 bis, rue du Puits, 78580 Maule; Pierre Gaudiani, 28, Avenue du Marechal Foch, 92260 Fontenay-aux-Roses, all of France

[21] Appl. No.: 665,034

[22] Filed: Mar. 6, 1991

[30] Foreign Application Priority Data

Mar. 6, 1990 [FR] France ................. 90 02909

[51] Int. Cl.⁵ .............................................. G01V 1/40
[52] U.S. Cl. .................................... 181/104; 181/106; 367/25; 367/35; 367/912; 73/152
[58] Field of Search ............... 181/104, 106, 113, 105, 181/106, 108; 367/912, 25, 28, 35, 37; 73/151, 152

[56] References Cited

U.S. PATENT DOCUMENTS

| | | | |
|---|---|---|---|
| 3,426,865 | 2/1969 | Henry | 181/104 |
| 3,614,891 | 10/1971 | Nolte | 181/104 |
| 3,781,784 | 12/1973 | Desbrandes | 367/30 |
| 3,961,683 | 6/1976 | Delignieres | 181/104 |
| 4,641,724 | 2/1987 | Chow et al. | 181/104 |
| 4,690,214 | 9/1987 | Wittrisch | 166/250 |
| 4,833,658 | 5/1989 | Staron | 367/27 |
| 4,982,381 | 1/1991 | Mari | 367/27 |

FOREIGN PATENT DOCUMENTS 0246148 11/1987 European Pat. Off. .
2145100 2/1973 France .
2094473 9/1982 United Kingdom .

Primary Examiner—J. Woodrow Eldred
Attorney, Agent, or Firm—Antonelli, Terry, Stout & Kraus

[57] ABSTRACT

A method of use of a logging tool (1) including a directional emission device (4) and/or reception device (R1, R2) and the achieving of several series of loggings while modifying between each series the orientation of the directivity diagrams. At least one first series is performed by orienting the directivity diagrams towards the top or the wall of a reservoir zone crossed through by the well bore, for example. At least one second series is carried out by orienting the directivity diagrams towards the opposite direction, for example. The recordings are then combined, and the reflected arrivals, which are generally concealed by casing waves, can be easily seen. This facilitates the locating of further discontinuities. The directional selectivity of the emissions and/or the receptions is, for example, obtained by positioning a cover fitted with a window (5) around emitting and/or receiving transducers. The method can be applied to loggings in horizontal well bores, for example.

13 Claims, 6 Drawing Sheets

LOGGING METHOD AND DEVICE IN WELL BORES UTILIZING DIRECTIONAL EMISSION AND/OR RECEPTION MEANS

BACKGROUND OF THE INVENTION

The object of the present invention is to provide a method and a device for the acquisition and the processing of signals obtained in, wells and notably in substantially horizontal deflected wells or well bores crossing a subterranean zone, allowing the good discrimination between the subsoil discontinuities. The invention is particularly adapted for discriminating between geologic discontinuities oriented substantially towards the same direction as the well and located on either side of the well, by means of recordings obtained with a logging tool displaced within the well. By what is called a deflected well is meant a well at least part of which is substantially horizontal or nearly horizontal.

Investigating a subsoil zone which might for example contain hydrocarbons can be achieved by drilling a well across the zone and by taking down within the well a logging tool comprising one or several emission units adapted for emitting signals in the geologic formations around the well and one or several reception units adapted for receiving the signals reflected and refracted by the subsoil discontinuities which are more or less close to the well. The received signals are generally transmitted to a surface laboratory and recorded. The recordings are then processed in order to make them more readable for the interpreter. The emitted and received signals can be of a very different nature. The signals may be, for example, acoustic waves, electromagnetic waves, etc. The method according to, the present invention is described hereafter in relation to the use of acoustic waves. It nevertheless goes without saying that this is a particular case which on no account restricts the generality of the method.

Well bores are often vertical or substantially vertical. But, in the subsoil zones which geologists think to be the most likely to contain workable deposits such as hydrocarbons, coal, lignite, etc, it is a common practice to carry out drillings that are very strongly inclined in relation to the vertical, even substantially horizontal, so that they cross the subterranean layers following a weak angle and information is obtained concerning the top and the wall (or base) of a possible working volume. Under these conditions, it is important to discriminate between the waves received from the formations above and below the well bore. This is possible as long as the dipping of the reflectors in relation to the direction of the well is not too weak and is of the same sign towards the top and the wall of the crossed zone or reservoir. If this is the case, the apparent velocities of the acoustic signals received (events) on either side of the well have opposite signs and they can be dissociated by using a conventional apparent velocity filtering method, as it is well-known in geophysics.

A prospecting method applicable in wells that are little inclined in relation to the horizontal is described for example in European patent application EP 246,148.

Discriminating on loggings of signals respectively coming from the wall and the top of a reservoir becomes very difficult when the relative dipping of the reflectors in relation to the direction of the well is almost nil or only amounts to some degrees because these signals have very close apparent velocities.

This configuration, which is frequent in strongly deflected or horizontal wells, can also be found in the vertical or little inclined parts of well bores crossing a fault zone substantially showing the same orientation. It is also well-known that the periphery of a well, whatever its direction may be, is generally weathered by the mud which has been used during the drilling process and which has infiltrated into the formations. The travel speed of the waves in this peripheral zone is therefore different from that in the surrounding formations, and parasitic reflections appear, therefore, on the interfaces that are substantially parallel to the direction of the well. Here again, discriminating on the recordings between the reflected waves respectively coming from the opposite sides of the well is almost impossible.

Published French patent application 2,639,719 describes a system for the acquisition and processing of signals in a well which makes it possible to achieve good discrimination between the geologic discontinuities located on either side of the well and having substantially the same orientation as it, notably in deflected wells crossing reservoir zones. The signals are acquired by means of a logging tool in which the emitting and receiving transducers can be displaced tranversely in relation to the well. This displacing can be obtained by using a logging tool comprising a body linked by moving arms to fastening skids against the walls of the well and by displacing the body in relation to the skids through the controlled opening of the arms. The displacing can also be obtained by displacing the transducers in relation to the body of the sonde. At least two series of emission-reception cycles are carried out along the same well portion, the position of the transducers in relation to the section of the well being different during each series, and the recording sections respectively obtained during the two series are combined in order to obtain sections where the discontinuities on either side of the well are separated from one another. The previous method is particularly adapted for discriminating and bringing out the discontinuities on either side of a well but it does not provide a sufficient damping of the refracted waves and of the waves known as the Stoneley waves.

SUMMARY OF THE INVENTION

The method according to the invention allows, like the method described in the previously by cited French patent application 2,639,719, facilitating the discrimination of the geologic discontinuities located on either side of a well and having substantially the same orientation as it. It comprises the use of a logging tool provided with a logging assembly including emission and reception means in order to emit signals and to receive the signals coming from the surrounding formations in response to the transmitted signals, and provided with means for displacing the tool along the well. The method comprises:

using means for making directional at least part of the assembly by giving the assembly a particular directivity configuration;

achieving, with the logging tool, at least one series of signal emission-reception cycles by displacing the tool along the well, the logging assembly set being in a determined first configuration identical for all the cycles of the series, in order to obtain at least one first set of recordings of the signals reflected by the discontinuities around the well, repeating the previous stage with the assembly being given a second configuration that is different from the first one, in order to obtain a second set of recordings; and making a comparison between various sets of recordings obtained in order to discriminate between the geologic discontinuities.

Emission means fitted with a directivity diagram with a relatively narrow opening are, for example, used.

The method comprises, for example, comparing the recordings obtained with the directional emission and/or reception means and the recordings obtained with other directional emission and/or reception means having another directivity diagram.

According to one embodiment procedure, the orientation of each directional diagram is modified between each of the series of cycles.

The method can comprise achieving at least two series of emission-reception cycles with the same directional emission and/or reception means by changing for each one of them the transverse position of the emission and/or reception means in relation to the axis of the well, at least one of the series being carried out with directional emission and/or reception means.

According to one embodiment, a particular directivity diagram corresponds to each transverse position of the emission and/or reception means.

The method can also comprise using directional emitting means with a first directivity diagram and directional reception means with a second directivity diagram different from the first directivity diagram, thereby improving reception of waves having undergone more than one reflection.

The device for implementing the method is characterized by the combination of a well logging sonde, provided with at least one signal emission source, with means for receiving the emitted signals reflected by the discontinuities around the well, and with means for making the source and/or the means for receiving the signals directional, means for transmitting the received signals to a surface recording set, means for processing the obtained recordings, and operating means for displacing the sonde along the well.

The emission source comprises, for example, an element for emitting signals and means for absorbing signals located on at least part of the periphery of the element.

The reception means can also comprise at least one receiver associated with an absorption means arranged around the receiver.

Each selective absorption means consists, for example, of a cover fitted with an oblong window transparent to the emitted signals.

As will be concretely shown in the description hereafter, the combination of recordings or logs obtained at the end of series of emission-reception cycles performed with changes in the directivity diagrams makes it possible to underscore reflections which are otherwise concealed by parasitic arrivals and thereby to bring out more easily discontinuities on either side of the well.

BRIEF DESCRIPTION OF THE DRAWINGS

Other features and advantages of the method and of the device according to the invention will be clear from reading the description hereafter of embodiment procedures given by way of non-limitative example, with reference to the accompanying drawings in which.

DESCRIPTION OF THE PREFERRED EMBODIMENTS

Figure 1:
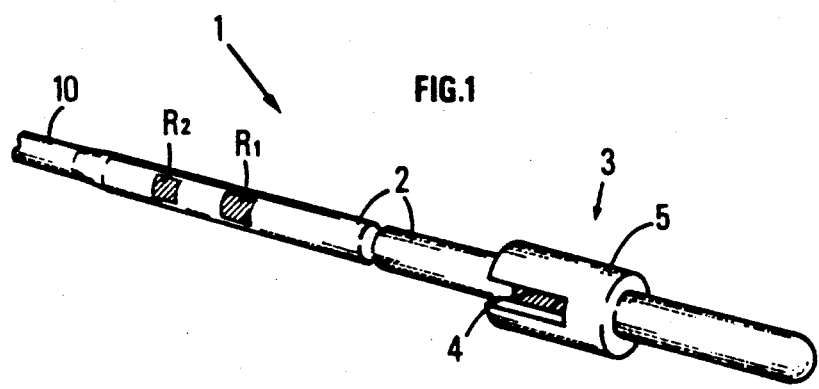
FIG. 1 diagrammatically shows a logging tool where the emission means comprise a selective absorption means, FIG. 2 diagrammatically shows an example of a cover adaptable to the emission and/or reception means of the logging tool.
Figure 2:
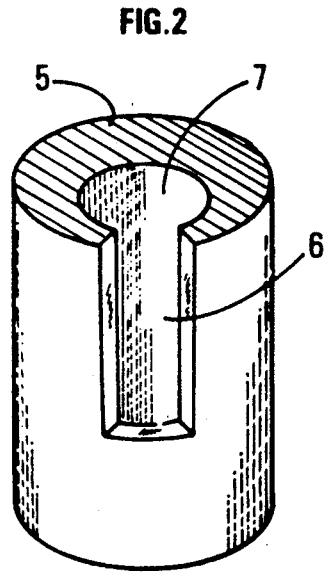
Figure 4:
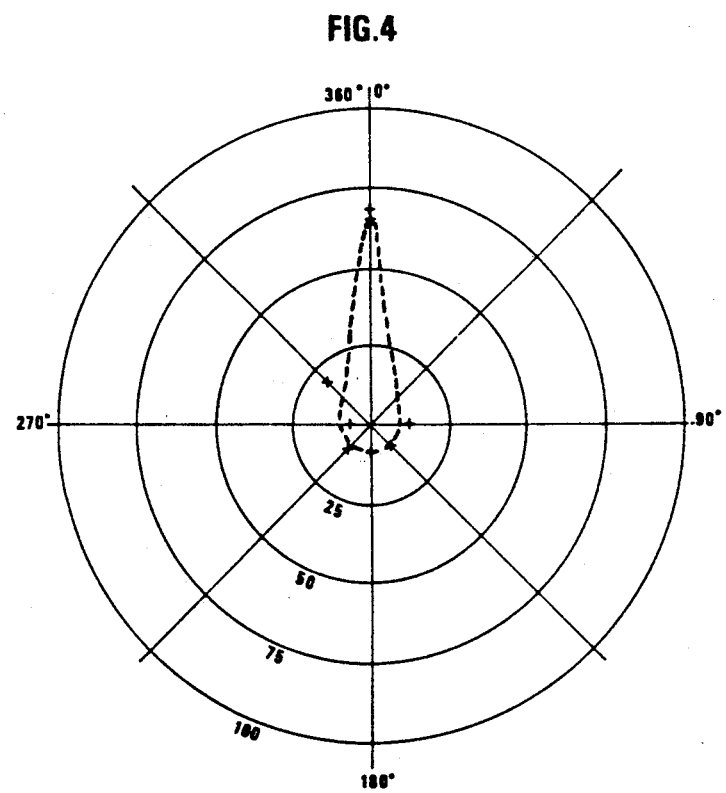
FIG. 4 shows an example of a directivity diagram obtained with a cover such as that of FIG. 2 and 3.
Figure 3:
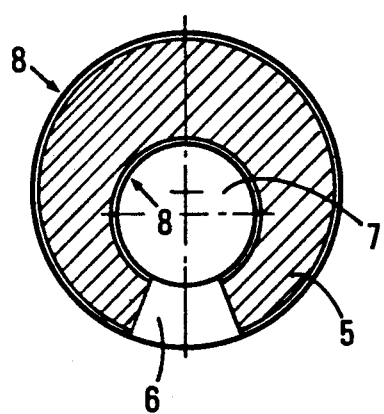
FIG. 3 shows a cutaway view of the same cover.

The logging tool 1 shown in FIG. 1 comprises a tubular body 2. A directional means for emitting signals 3 is arranged towards a first end of the body 2. This means comprises, for example, a non directional emitter 4 of any type for emitting acoustic waves in all directions around the tool. A directional absorption means is arranged around emitter 4. This means consists for example (FIG. 2, 3) of a sleeve or cover 5 made of a material absorbing acoustic waves and fitted with a window 6 transparent to these waves. This transparent window can be obtained, for example, by arranging a lateral opening in the wall of the sleeve over a given length of the latter. With an opening following an angular sector of 60° for example, a directional diagram analogous to that shown in FIG. 4 is obtained. The inner section of sleeve 5 is adapted to the outer section of the body 2 of the tool. The inner passageway 7 of the sleeve is preferably eccentric on the window side, as depicted in FIGS. 2 and 3 in order to reinforce the absorbing of the waves in the direction opposite this window 6.

Sleeve 5 is cast in a material absorbing acoustic waves and is clad with a protective envelope 8 on its inner face and on its outer face. It is adapted around the body of the tool at the position of emitter 4.

Emitter 3 may consist of a transducer, a sparker of a well-known type, etc. These examples are not limitative.

Reception means or receivers consisting, for example, of two transducers R1 and R2 are arranged at a certain distance towards the opposite end of the body 2.

Figure 10:
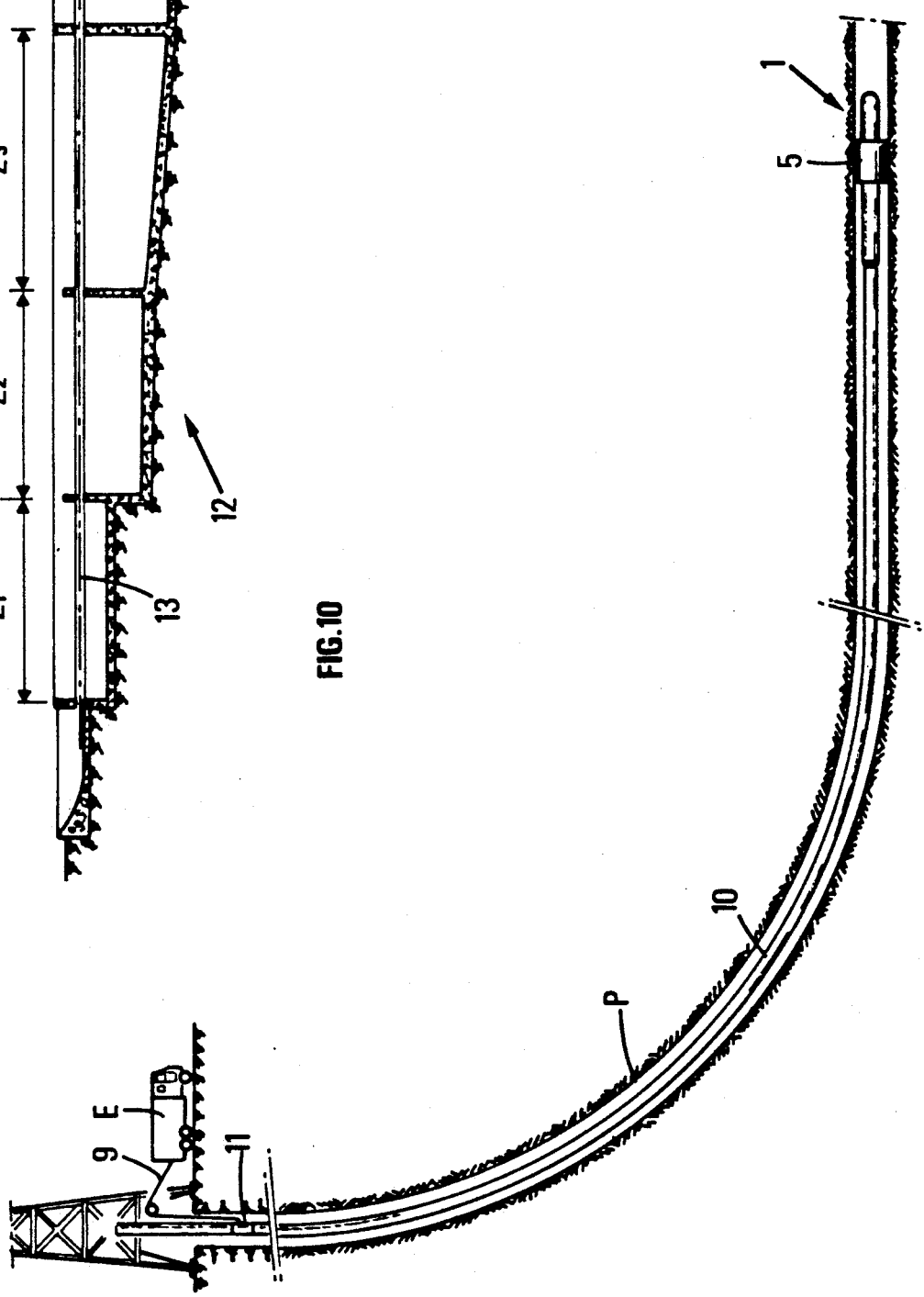
FIG. 10 diagrammatically shows a logging tool such as that of FIG. 1 taken down into the deflected part of a well.

This sonde is connected with a surface control and recording set E (FIG. 10) by a feeder and power cable 9. It is taken down and pushed into the deflected parts of well P at the end of a rather rigid tubular column 10. Cable 9 is preferably located within the column. It goes outside the latter in order to be linked to laboratory E by a side-entry sub 11 of a well-known type. Such a layout is described for example in the French patent 2,544,013 or U.S. Pat. No. 4,690,214.

Receivers R1, R2 can also be directional. It is possible to use receivers fitted from their manufacturing with a directional reception diagram or with non or little directional reception means and to arrange around them covers similar to cover 5 surrounding source 4.

With such a logging tool modified to make the emission means and/or the reception means directional, it is possible to underscore discontinuities which would otherwise be indiscernible on the recordings, concealed by parasitic arrivals.

The emission source and/or the reception means being made directional with a directivity diagram oriented for example towards the same side of the well, a first series of logs is carried out by displacing tool 1 all along the well portion crossing a zone to be explored.

Cover 5 around at least one of the two receivers R1, R2 can be oriented substantially in the same direction as that which is associated with the emitter 4 in order preferably to pick-up the direct arrival of reflected waves. The cover around at least one of the two receivers can also be oriented in the opposite direction in order preferably to receive the doubly reflected arrivals which are to be discriminated more easily from the previous ones.

With an emission source and/or reception means whose directivity diagram is different from that which is used for the first series, a second series of acoustic logs is achieved. For this second series of acoustic logs, it is possible to utilize a source and reception means without a cover. But a source and/or directivity means whose directional diagram is comparable, with an orientation substantially opposite to that selected for the first series of logs, are advantageously used. The swiveling of the, or of each, directivity diagram can be simply obtained with the cover described above by rotating it in order to change the orientation of window 6.

By comparing the logs with treatment means in surface laboratory E and by using well-known methods called average value and anti-average value methods, as well as band-pass filtering, it is then possible to remove numerous very energetic parasitic arrivals and notably those due to the well casing, and to underscore the reflected arrivals better.

The method according to the invention can also be combined with that which is described in the above cited French patent application 2,639,719, where the position of the tool in relation to the section of the well is modified by eccentricity between two series of successive logs. In each series of successively achieved logs, the emission means and/or the reception means are directed in such a way that their directivity diagrams are oriented for example towards the side of the well which is closest to the tool, and a similar comparing of the recordings is carried out. Through this combination of the directivity and eccentricity effects, the filtering and the bringing out of the reflected arrivals are still developed.

In the same way as previously, at least one of the directional receivers can be oriented substantially in the direction opposite that which was preferably chosen for the emission in order to pick-up arrivals coming from the opposite side of the well which has undergone more than one reflection.

Figure 5:
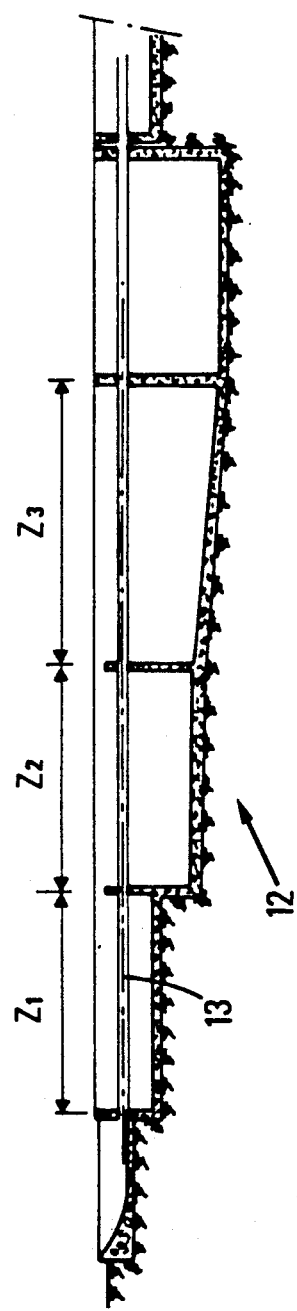
FIG. 5 shows a physical model representative of various interfaces encountered by the signals emitted in a well equipped for example with a casing pipe.

The effect of clarification of the acoustic logs obtained with directional means has been experimentally tested on a modeling device 12 such as that which is diagrammatically shown in FIG. 5.

Figure 6:
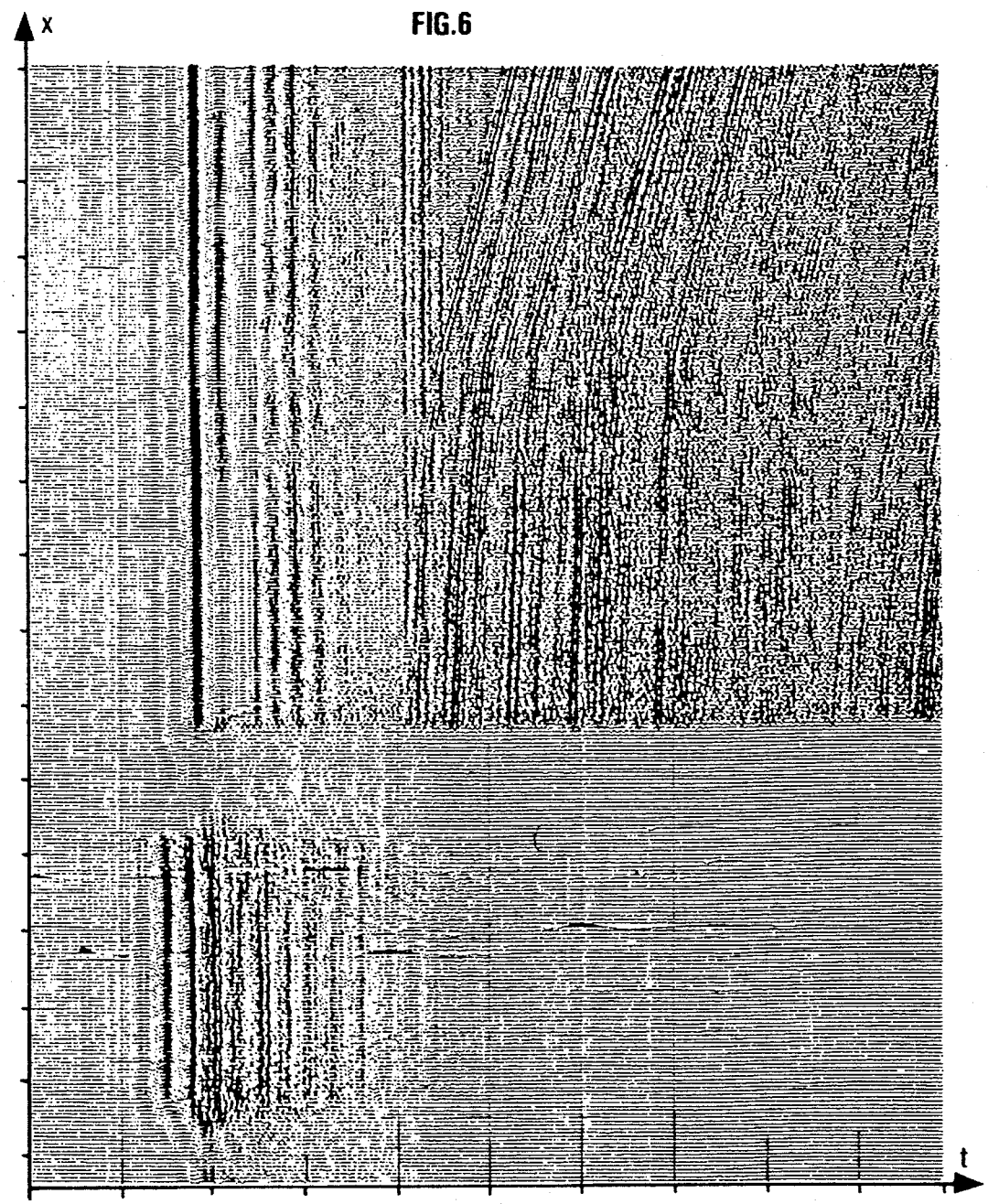
FIG. 6 shows a series of recordings or logs obtained by displacing a logging tool in a subsoil modeling device, the source being cover-free.
Figure 7:
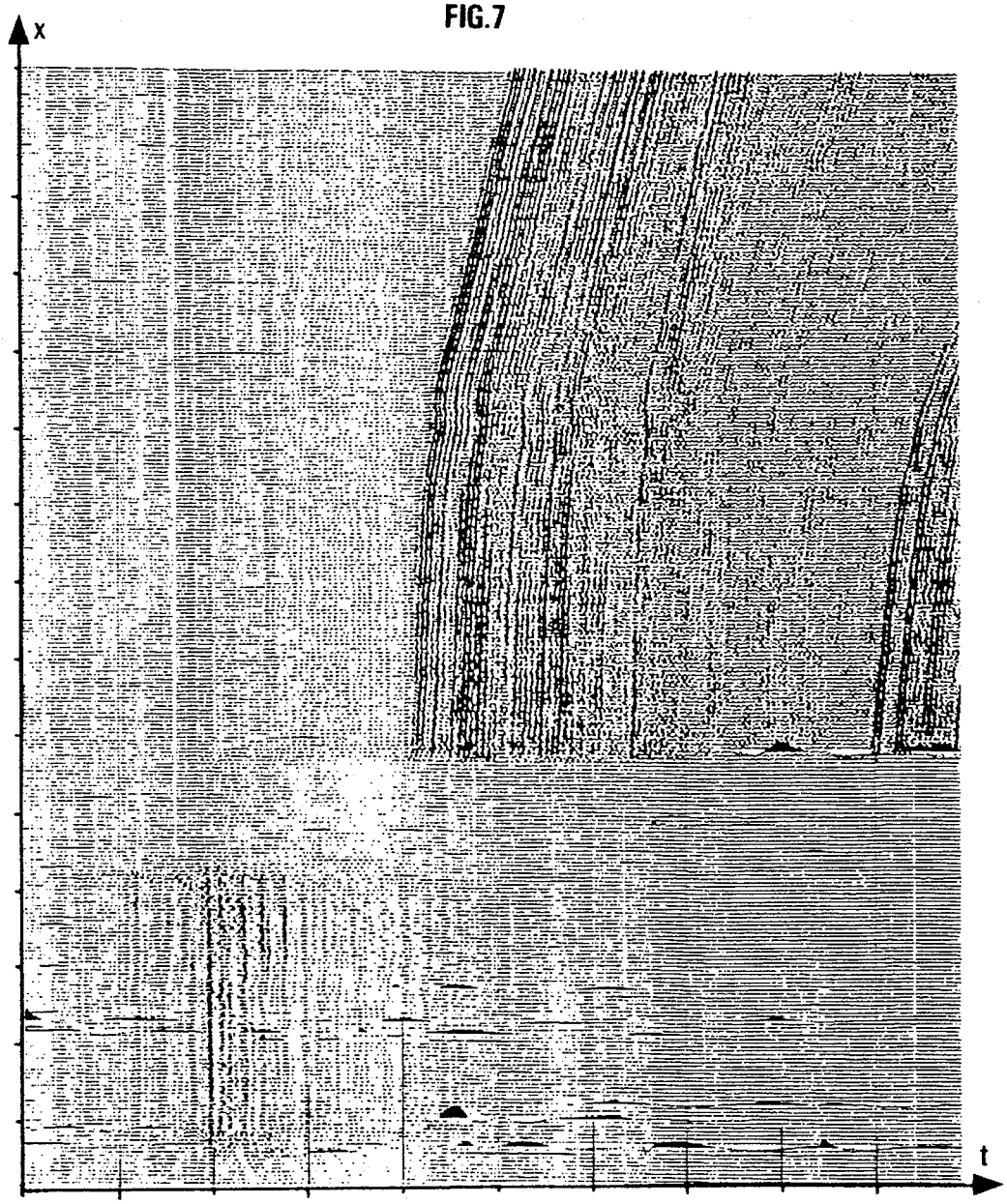
FIG. 7 shows a series of recordings obtained in the same conditions but with a source equipped with a cover.

The modeling device 12 is located in a trench dug in the soil. It mainly consists of a block whose wall is made of concrete and which comprises several compartments Z1, Z2, Z3 separated from one another by partitions. The bottom of the first compartment Z1 is substantially flat and filled with concrete. Compartments Z2 and Z3 contain water. The bottoms of these two compartments show a slight slope, from 1° to 2° for compartment Z2 and from 5° to 9° for compartment Z3. A substantially horizontal supporting chute 13 is arranged in the upper part of the three compartments Z1 to Z3. At the level of the first compartment, the chute is made of concrete. At the level of the following two, it consists of a portion of a tube suspended in water and made of PVC for example. A logging tool similar to that which is diagrammatically shown in FIG. 1 has been displaced all along chute 13, and comparative acoustic logs have been carried out with an emitter 3 without a cover (FIG. 6) and with an emitter made directional by a cover fitted with a window 5 (FIG. 7). The window of the cover is directed towards the base of block 13. It can be seen by comparing the logs obtained in both cases that the emission directivity obtained with an acoustic source fitted with a cover has the effect of very efficiently lightening the wave arrivals linked to the refractions and the reflections on the edges of the modeling device. The effect is particularly visible at the level of zones Z2 and Z3. Consequently, the reflections associated with the base plate, that is to say the bottom of the compartments, appear with an optimum signal-to-noise ratio.

Figure 8:
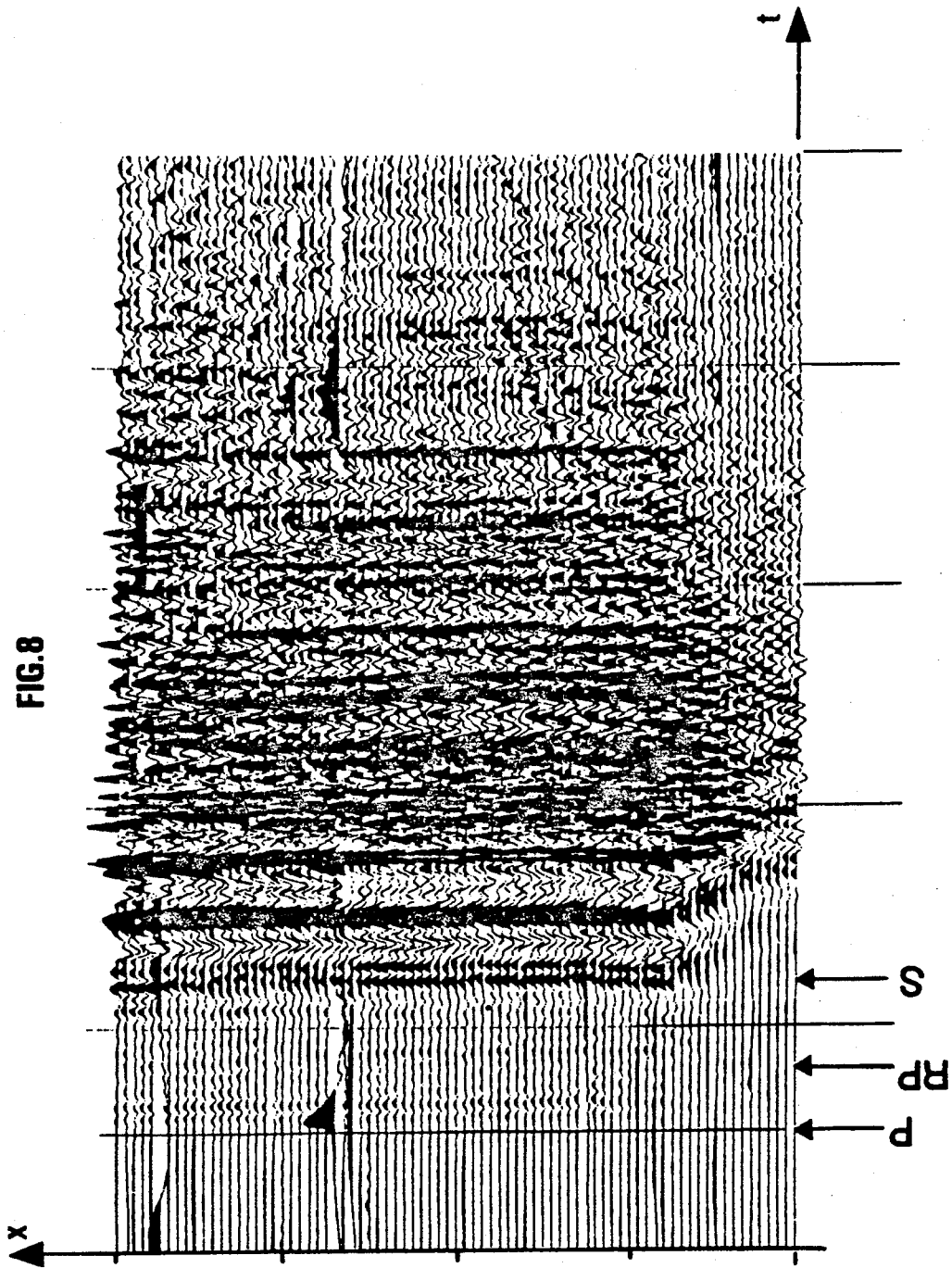
FIG. 8 is a more detailed view of part of the recordings of FIG. 6 relating to the same portion of the modeling device, obtained with a source that is cover-free.
Figure 9:
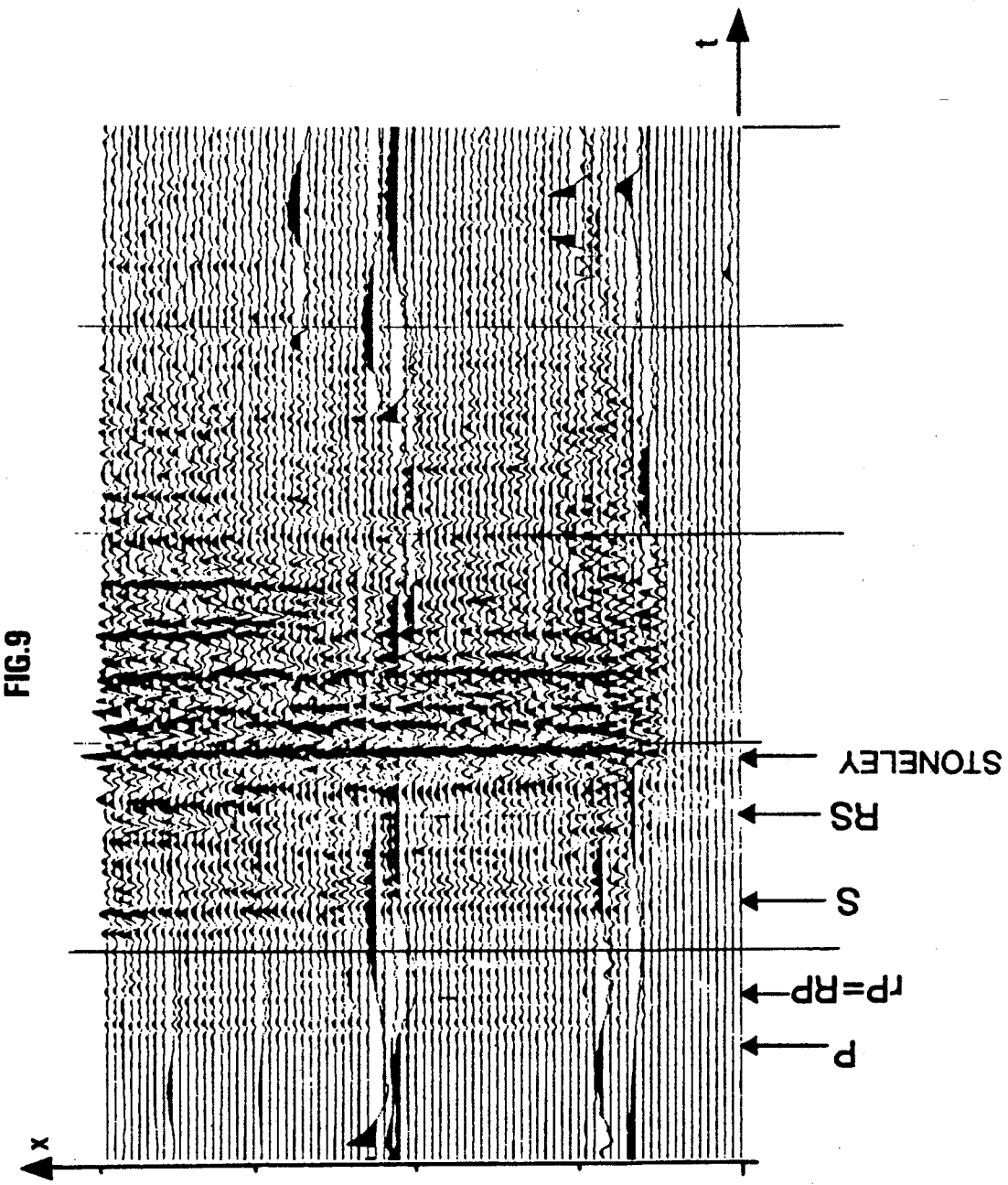
FIG. 9 is a more detailed view of part of the recording of FIG. 7 relating to the same portion of the modeling device, obtained with a source equipped with a cover.

The logs of FIG. 8 and 9 have been obtained at the level of zone Z1 of the device filled with concrete. The first ones (FIG. 8) correspond to a source without a cover, the second ones to a source fitted with a cover. Comparing the logs obtained in both cases shows that, with a directional source, it is possible to split up more easily the refracted arrivals into waves P (compression waves) and waves S (shear waves). In FIG. 8 and 9:

P is the wave P refracted in the reservoir (formation underlying the modeling device);

S is the refracted wave S in the reservoir;

rP is the wave P refracted on the base plate, wall of the reservoir;

RP is the wave P reflected on the base plate or bottom of the modeling device; and RS is the wave S reflected on the base plate.

We claim:

1. A method of acquiring and treating signals from a well, to detect geological discontinuities located on either side of the well, using a logging tool with a logging assembly including emission means for emitting signals and reception means for receiving signals from the surrounding formations in response to the emitted signals, and means for displacing the logging tool along the well, said method comprising the steps of:

(a) activating the logging tool to provide at least one series of signal emission-reception cycles with a particular directivity while displacing the tool along the well, to obtain at least one first set of recordings of received signals reflected by discontinuities around the well, (b) repeating step (a) with a second directivity different from the the particular directivity to obtain a second set of recordings of received signals reflected by the discontinuities; and (c) comparing of the obtained sets of recordings to detect geological discontinuities.

2. A method as claimed in claim 1, wherein step (a) comprises using emission means fitted with a cover having a limited opening with a predetermined directivity.

3. A method as claimed in claim 1 or 2, wherein step (c) comprises comparing the recordings obtained with the particular directivity to recordings obtained with the second directivity.

4. A method as claimed in claim 3, comprising modifying the directivity between two successive series of cycles.

5. A method as claimed in claim 1, further comprising between step (a) and step (b) changing the transverse position of at least one of the emission means and the reception means in relation to the well axis, at least one of said series being achieved with directional emission and/or reception means.

6. A method as claimed in claim 5, wherein a particular directivity diagram corresponds to each transverse position of the emission means and the reception means.

7. A method as claimed in claim 1, wherein step (a) comprises using directional emission means with a first directivity diagram and directional reception means with a second directivity diagram different from the first directivity diagram, thereby improving reception of waves that have undergone more than one reflection.

8. Apparatus for acquiring and treating signals from a well, to detect geological discontinuities located on either side of the well, said apparatus comprising:
a logging tool including a logging assembly having emission means for emitting signals and reception means for receiving signals from the surrounding formations in response to the emitted signals;
means for displacing said logging tool along the well;
means for making at least part of said logging assembly directional to cause said assembly to have a particular directivity configuration;
means for activating said logging tool as said logging tool is being displaced along the well to provide at least one series of signal emission-reception cycles with a particular directivity in order to obtain at least one first set of recordings of received signals reflected by discontinuities around the well;
means for positioning said directional making means to a second directivity different from the particular directivity;
means for activating said logging tool as said logging tool is being displaced along the well to obtain a second set of recordings of received signals reflected by the discontinuities; and
means for comparing the obtained sets of recordings to detect geological discontinuities.

9. Apparatus as claimed in claim 8 wherein said directivity making means comprises a cover having a limited opening with a predetermined directivity.

10. Apparatus as claimed in claim 8 or 9, wherein said comparing means comprises means for comparing the recordings obtained with the particular directivity to recordings obtained with the second directivity.

11. Apparatus as claimed in claim 10, wherein said directivity making means further comprises means for modifying the directivity.

12. Apparatus as claimed in claim 8, further comprising means for changing the transverse position of at least one of the emission means and the reception means in relation to the well axis.

13. Apparatus as claimed in claim 8, wherein said emission means has a first directivity diagram and said reception means has a second directivity diagram different from the first directivity diagram to improve reception of waves that have undergone more than one reflection.

* * * * *